US012338101B2

(12) United States Patent
Ortbauer

(10) Patent No.: US 12,338,101 B2
(45) Date of Patent: Jun. 24, 2025

(54) HANDRAIL TENSION MONITORING DEVICE FOR A PASSENGER TRANSPORT SYSTEM

(71) Applicant: INVENTIO AG, Hergiswil (CH)

(72) Inventor: Martin Ortbauer, Vienna (AT)

(73) Assignee: Inventio AG, Hergiswil (CH)

( * ) Notice: Subject to any disclaimer, the term of this patent is extended or adjusted under 35 U.S.C. 154(b) by 54 days.

(21) Appl. No.: 18/246,260

(22) PCT Filed: Sep. 9, 2021

(86) PCT No.: PCT/EP2021/074821
§ 371 (c)(1),
(2) Date: Mar. 22, 2023

(87) PCT Pub. No.: WO2022/063595
PCT Pub. Date: Mar. 31, 2022

(65) Prior Publication Data

US 2023/0356983 A1 Nov. 9, 2023

(30) Foreign Application Priority Data

Sep. 25, 2020 (EP) .................................... 20198493

(51) Int. Cl.
*B66B 23/20* (2006.01)
*B66B 25/00* (2006.01)

(52) U.S. Cl.
CPC ............ *B66B 23/20* (2013.01); *B66B 25/006* (2013.01)

(58) Field of Classification Search
None
See application file for complete search history.

(56) References Cited

U.S. PATENT DOCUMENTS 4,928,538 A * 5/1990 Burdess .................. G01L 5/042 73/DIG. 1
5,092,446 A * 3/1992 Sullivan, Jr. ............ B66B 29/04 198/331

(Continued)

FOREIGN PATENT DOCUMENTS

EP 3279132 A1 2/2018
JP 2006008388 A 1/2006

(Continued)

OTHER PUBLICATIONS

International Search Report for International Application No. PCT/EP2021/074821 dated Dec. 22, 2021.

*Primary Examiner* — William R Harp
(74) *Attorney, Agent, or Firm* — Knobbe, Martens, Olson & Bear, LLP

(57) ABSTRACT

A handrail tension monitoring device for a passenger transport system designed as a moving walkway or escalator can include a distance sensor and a signal processing unit. Measurement signals detected by the distance sensor can be processed and evaluated in the signal processing unit. A vibration frequency of a scanned handrail of the passenger transport system can be determined from the signal curve of the measurement signals and the vibration frequency can be compared with a lower threshold value or upper threshold value. An alarm signal can be generated if the lower threshold value is not reached and a warning signal can be generated if the upper threshold value is exceeded.

12 Claims, 3 Drawing Sheets

(56) References Cited

U.S. PATENT DOCUMENTS

| | | | | |
|---|---|---|---|---|
| 10,488,282 | B2 * | 11/2019 | Guru | H02P 6/10 |
| 2020/0013099 | A1 | 1/2020 | Jarvis | |
| 2020/0180915 | A1 | 6/2020 | Ogura | |

FOREIGN PATENT DOCUMENTS

| | | | |
|---|---|---|---|
| JP | 2008063056 | A | 3/2008 |
| JP | 2009227363 | A | 10/2009 |
| JP | 2015160724 | A | 9/2015 |
| JP | 6269165 | B2 | 1/2018 |
| JP | 2019-158514 | A | 9/2019 |
| WO | WO 2020016016 | A1 | 1/2020 |

* cited by examiner

HANDRAIL TENSION MONITORING DEVICE FOR A PASSENGER TRANSPORT SYSTEM

TECHNICAL FIELD

The present disclosure relates to a continuously conveying passenger transport system which can be walked on and is designed as an escalator or moving walkway.

SUMMARY

Escalators and moving walkways are used to transport passengers standing on step units such as treads or pallets within buildings or structures.

An escalator or a moving walkway has a moving handrail on both sides. These are used to allow passengers to hold onto one of the handrails of the escalator or the moving walkway to stay balanced and avoid falling. For example, a passenger may lose his balance if he is unexpectedly pushed by another passenger, or if the escalator or moving walkway stops abruptly. The transitions that are present in escalators between the horizontal travel portions of the entry and exit regions and the inclined travel portion therebetween also pose a certain risk of falling when the steps move vertically relative to one another and the passenger on the upper step has placed his toes only just at the edge of the step.

However, it must be ensured that the handrail moves as synchronously as possible with the step belt or pallet belt. Since the handrails or handrail belts are usually driven by a friction drive, the handrail must be sufficiently pretensioned against the friction wheel so that the frictional force between the handrail and the friction wheel of the handrail drive is sufficiently high to prevent slippage between these two friction partners.

In order to tension the handrail, JP2008063056 A describes, for example, a handrail tensioning device having a tensioning element. Due to wear and settling, as well as the constant bending changes during operation, the handrail becomes longer and must therefore be re-tensioned from time to time. In order to detect the time of re-tensioning, this handrail tensioning device has a built-in sensing means that scans the end position of the tensioning element and sends a signal to the controller of the passenger transport system as soon as this end position is reached and the handrail has to be re-tensioned. The problem with this device is that the time of re-tensioning is displayed only when this is necessary, but a prediction of a probable maintenance date cannot be made.

In addition, the handrail pretensioning force must not be too high, otherwise the handrail will be pressed too hard against the guide rollers and guide profiles with which it is continuously guided, and the energy required to move the handrail and the associated wear on these parts are therefore too high. Excessive handrail pretensioning cannot be detected with this sensing means either.

The object of the present disclosure is therefore to achieve a precise and more meaningful determination of the existing handrail pretensioning force.

This object is achieved by a handrail tension monitoring device for a passenger transport system designed as a moving walkway or escalator. For this purpose, the handrail tension monitoring device comprises at least one distance sensor and a signal processing unit. The measurement signals detected by the distance sensor can be processed and evaluated in the signal processing unit, the vibration frequency of a scanned handrail of the passenger transport system being able to be determined in the signal processing unit from the signal curve of the measurement signals. The determined vibration frequency can at least be compared with a lower threshold value, an alarm signal being generated if the lower threshold value is not reached.

In other words, in analogy to a vibrating string, the handrail pretensioning force is assessed on the basis of the vibration behavior of the handrail. Known parameters here are the length of a freely suspended region of the handrail, its structure, dimensions and materials used, as well as the measured parameters of vibration frequency and optionally the amplitude height. The parameter to be determined is the handrail pretensioning force. The higher the handrail pretensioning force, the higher the vibration frequency of the handrail and vice versa. As soon as the determined oscillation frequency has fallen below the lower threshold value, the minimum handrail pretensioning force has not been met and this can lead to slippage between the friction partners mentioned above. A change trend that can be extrapolated can also be identified from the vibration behavior or the changing vibration frequency. Using this extrapolation, a prediction can be made as to when the lower threshold value will be reached and when the handrail will have to be re-tensioned. This makes it much easier to plan maintenance.

The handrail is preferably stimulated to vibrate by its movement during the conveying operation. Optionally, a suitably designed device, such as an alternating magnetic field switched on for a short time, can support the excitation to vibration, since the handrails usually have tension members made of steel strands.

The lower threshold value is a comparative value which represents the minimum required handrail pretensioning force. The lower threshold value and the upper threshold value described further below are preferably determined after the assembly of a passenger transport system by tests thereon and can then be used for all structurally identical and possibly even structurally similar passenger transport systems. Of course, the threshold values can also be determined specifically for each completed passenger transport system and, for example, stored in a storage medium of the signal processing unit and retrieved by same. Due to the lower threshold value, by means of operating state information (whether the passenger transport system is stationary or in conveying operation), a handrail failure (tearing) can also be recognized immediately and suitable measures such as an emergency stop of the passenger transport system can be initiated.

As already mentioned, the determined vibration frequency can also be compared with at least one upper threshold value, a warning signal being generated if the upper threshold value is exceeded. The upper threshold represents the maximum permissible handrail pretensioning force.

So that the handrail voltage monitoring device can be installed in the passenger transport system, it preferably has a holder for the distance sensor, this holder being mountable on a stationary component of the passenger transport system. The holder can be designed such that in the operating state of the handrail tension monitoring device, the distance sensor thereof is directed, in a freely suspended region of the handrail, against a hand support surface or against a rear side of the handrail. The hand support surface is the broad surface of the handrail on which the user places his hand while grasping the two side surfaces of the handrail with his thumbs and fingers. The rear side of the handrail is usually provided with a slidable fabric so that it can slide as well as possible on the surfaces of a guide profile. Thus, with this arrangement, the hand support surface or the rear side of the handrail moves towards the sensor or away therefrom. The continuously detected measured values of the distance sensor result in a measured value curve that reflects the vibrations occurring on the handrail. Continuous detection of the measured values can also be understood to mean detection in discrete steps with high cadence and the like, which result in a meaningful and evaluable measured-value curve.

In order to simplify the installation, the holder can have adjustment means for aligning the distance sensor relative to the hand support surface or to the rear side of the handrail. During installation, the distance sensor can be aligned with the handrail in such a way that, on the one hand, the distance can be continuously detected with sufficient precision and, on the other hand, the handrail does not collide with the distance sensor when the minimum pretension and thus the greatest amplitude is reached.

For example, a TOF camera, an infrared distance sensor, a laser distance sensor, an ultrasonic sensor with transit time detection, or a radar sensor can be used as the distance sensor. In principle, any sensor that can record the vibrations as a distance signal curve can be used.

The signal processing unit of the handrail voltage monitoring device can be implemented, for example, in the distance sensor, in a controller of the passenger transport system, or in a data cloud. In other words, the signal processing unit is not bound to a specific location, but it must be connected, or at least be connectable periodically, to the distance sensor in a wired and/or wireless signal-transmitting manner.

As soon as the signal processing unit detects that the lower threshold value has not been met or that the upper threshold value has been exceeded, it can output an alarm signal and/or warning signal. This alarm signal and/or warning signal can be transmitted to a controller of the passenger transport system. This can influence the driving operation of the passenger transport system in such a way that it is stopped immediately, for example, the driving speed is reduced or there is a wait for a time until only a small number of users is registered by another sensor and only then is the escalator shut down for corresponding maintenance work.

Each passenger transport system preferably has a handrail tension monitoring device for each of its handrails.

Furthermore, the handrail voltage monitoring device can have a signal transmission device or can be connected to a signal transmission device via which at least the detected signal curve of the measurement signals can be transmitted to a digital twin data record of the passenger transport system.

In other words, parallel to the physically existing passenger transport system, a digital twin data record can be present that virtually depicts this passenger transportation system. Here, the measurement signals or signal curves generated by the distance sensor can be transmitted to the digital twin data record via the signal transmission device. By processing these measurement signals and signal curves in connection with the data of the digital twin data record, dynamic processes of the operational passenger transport system can be simulated and displayed in real time on the digital twin data record.

The digital twin data record comprises the characterizing properties of components of the physical passenger transport system in a machine-processable manner. This digital twin data record consists of component model data records comprising data which were determined by measuring characterizing properties on the physical passenger transport system after assembly and installation thereof in a structure.

The characterizing properties of the physical components can be the geometric dimensions of the component, the weight of the component and/or the surface quality of the component. Geometric dimensions of the components can be, for example, a length, a width, a height, a cross-section, radii, fillets, etc. of the components. The surface quality of the components can include, for example, roughnesses, textures, coatings, colors, reflectivities, etc. of the components. The characterizing properties can also be dynamic information, for example, a motion vector of a component model data record, which indicates its direction of movement and speed relative to surrounding component model data records or to a static reference point of the digital twin data record.

The characterizing properties can relate to individual components or component groups. For example, the characterizing properties can relate to individual components from which larger, more complex component groups are assembled. Alternatively or additionally, the properties can also relate to more complex equipment assembled from a plurality of components, such as drive motors, gear units, conveyor chains, etc.

The signals from the distance sensor are transmitted as measurement data to the digital twin data record and, using a set of rules, characterizing properties of the component model data records affected by the transmitted measurement data are redetermined. The characterizing properties of the affected component model data records are then updated with the redetermined, characterizing properties. Specifically, for example, the vibration frequency and amplitude measured by the distance sensor can be transferred to the component model data record representing the handrail and to the component model data records forming the guide profiles and guide rails that guide the handrail. In this way, for example, in the case of the digital twin data record reproduced on a screen as a virtual representation, all dynamically movable component model data records can be displayed with the same movements as their physical components in the physical passenger transport system at the time the signals are recorded. The interactions of the component model data records can be simulated from the movements of the component model data records and the forces acting on the components can be determined using the appropriate, known calculation programs from the fields of physics, mechanics and strength theory.

After this, by means of the monitoring, changes and change trends in the updated characterizing properties of the continuous handrail and their influence on the handrail and on the components interacting with said handrail can be tracked and evaluated by means of the digital twin data record by calculations and/or by static and dynamic simulations. As a result, the time of maintenance can be determined very precisely and optionally a list of the components that are to be replaced due to wear and that interact with the handrail can be created. Of course, evaluations with regard to dynamic processes that exceed limit values are also possible on the digital twin data record, for example, in the case of resonance vibrations that build up.

The present disclosure also comprises a method for processing and evaluating measurement signals from the handrail tension monitoring device described above. The vibration frequency of the scanned handrail is determined in the signal processing unit from the signal curve of the measurement signals and the determined vibration frequency is compared with at least one lower threshold value. From the comparison (change trend in the vibration frequency and the difference from the lower threshold value), a maintenance time can be determined, for example, at which the handrail has to be re-tensioned. If the lower threshold value is not met, an alarm signal is generated, which is transmitted, for example, to the controller of the passenger transport system for further processing. Based on the alarm signal, said controller can, for example, stop the drive and send a message to a maintenance center.

The determined vibration frequency can also be compared in the signal processing unit with at least one upper threshold value, a warning signal being generated if the upper threshold value is exceeded. The drive does not necessarily have to be stopped due to the warning signal. In order to avoid excessive wear, however, the signal processing unit can, for example, send a message to a mobile phone belonging to the maintenance worker who has just tensioned the handrail too much.

In order to verify the vibrating frequency, a number of successive amplitude heights of the vibrating handrail are determined from the signal curve of the measurement signals and said amplitude heights are compared with a height limit value and a number limit value. If a certain number of amplitudes exceed the height limit value, this confirms that the vibration frequency is too low or the handrail pretensioning force is too low.

As already mentioned, the detected signal curve can be transmitted to a digital twin data record of the passenger transport system and the effects of the vibrating handrail on other components of the passenger transport system are determined by means of static and dynamic simulations.

Since the tensile forces in the handrail are different depending on the direction of rotation due to the friction conditions and the position of the handrail drive relative to the position of the distance sensor, the vibration frequency of a handrail is usually dependent on the direction of travel. As a result, the threshold values can be established depending on the direction of travel.

It should be noted that some of the possible features and advantages of the disclosure are described herein with reference to different embodiments. A person skilled in the art recognizes that the features can be combined, adapted or replaced as appropriate in order to arrive at further embodiments of the disclosure.

BRIEF DESCRIPTION OF THE DRAWINGS

Embodiments of the disclosure will be described in the following with reference to the accompanying drawings, with neither the drawings nor the description being intended to be interpreted as limiting the disclosure.

The drawings are merely schematic and not true to scale. Like reference signs refer to like or equivalent features in the various drawings.

DETAILED DESCRIPTION

Figure 1:
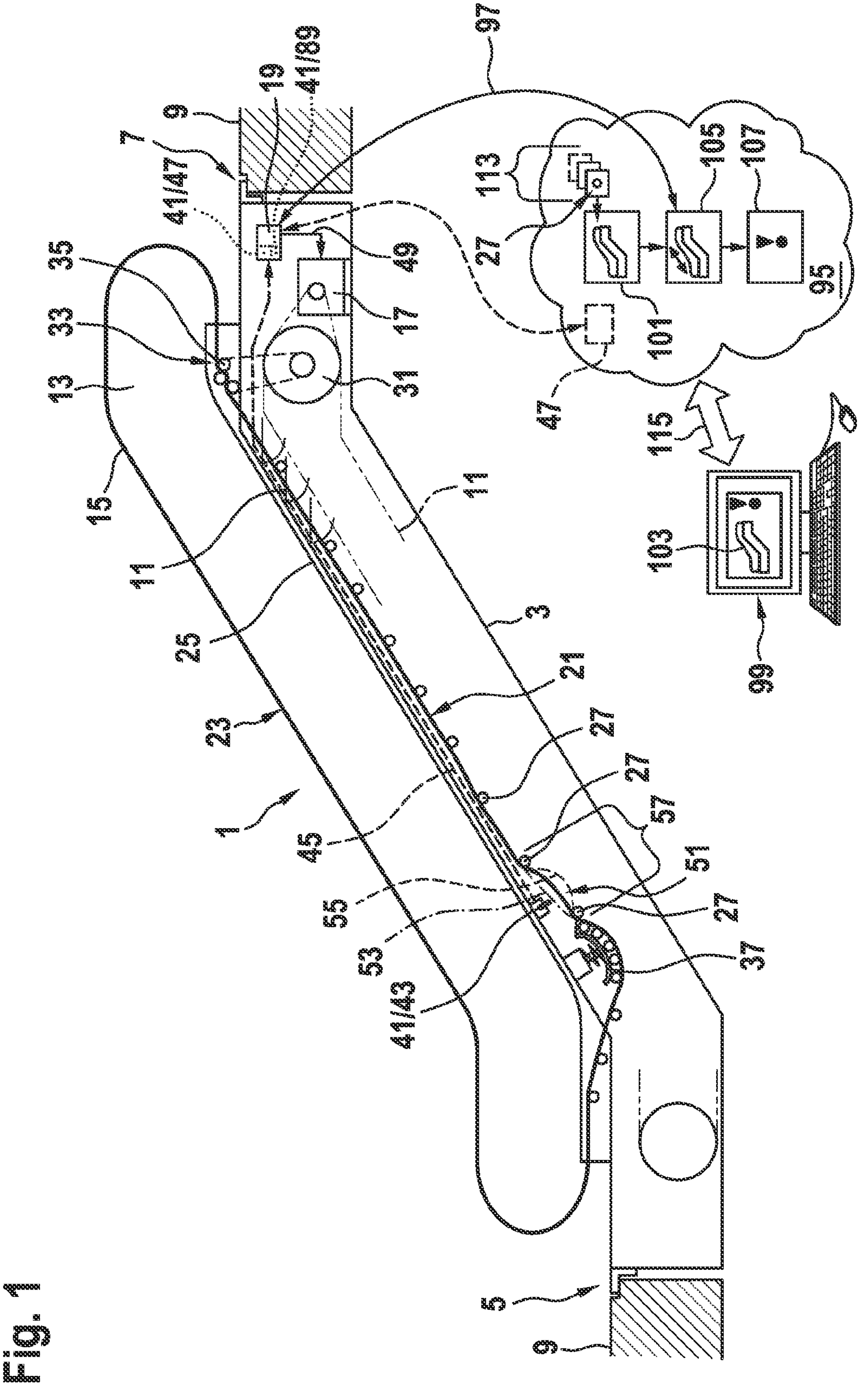
FIG. 1 schematically shows the most important components or parts of an escalator, in particular the handrail and handrail tensioning device thereof as well as the components of a handrail tension monitoring device according to the disclosure having a distance sensor.

FIG. 1 schematically shows the most important components or parts of a passenger transport system 1 designed as an escalator. This system has a supporting structure 3, indicated by contour lines, which is arranged between two support points 5, 7 of a structure 9. Here, the supporting structure 3 accommodates the other components of the passenger transport system 1, such as a conveyor belt 11 guided continuously around the supporting structure 3, two balustrades 13 each having a continuously guided handrail 15 (only one balustrade 13 shown), a drive unit 17 for driving the conveyor belt 11 and the handrails 15, as well as a controller 19, which is connected via a signal line 49 to the drive unit 17 for controlling same.

Figure 2:
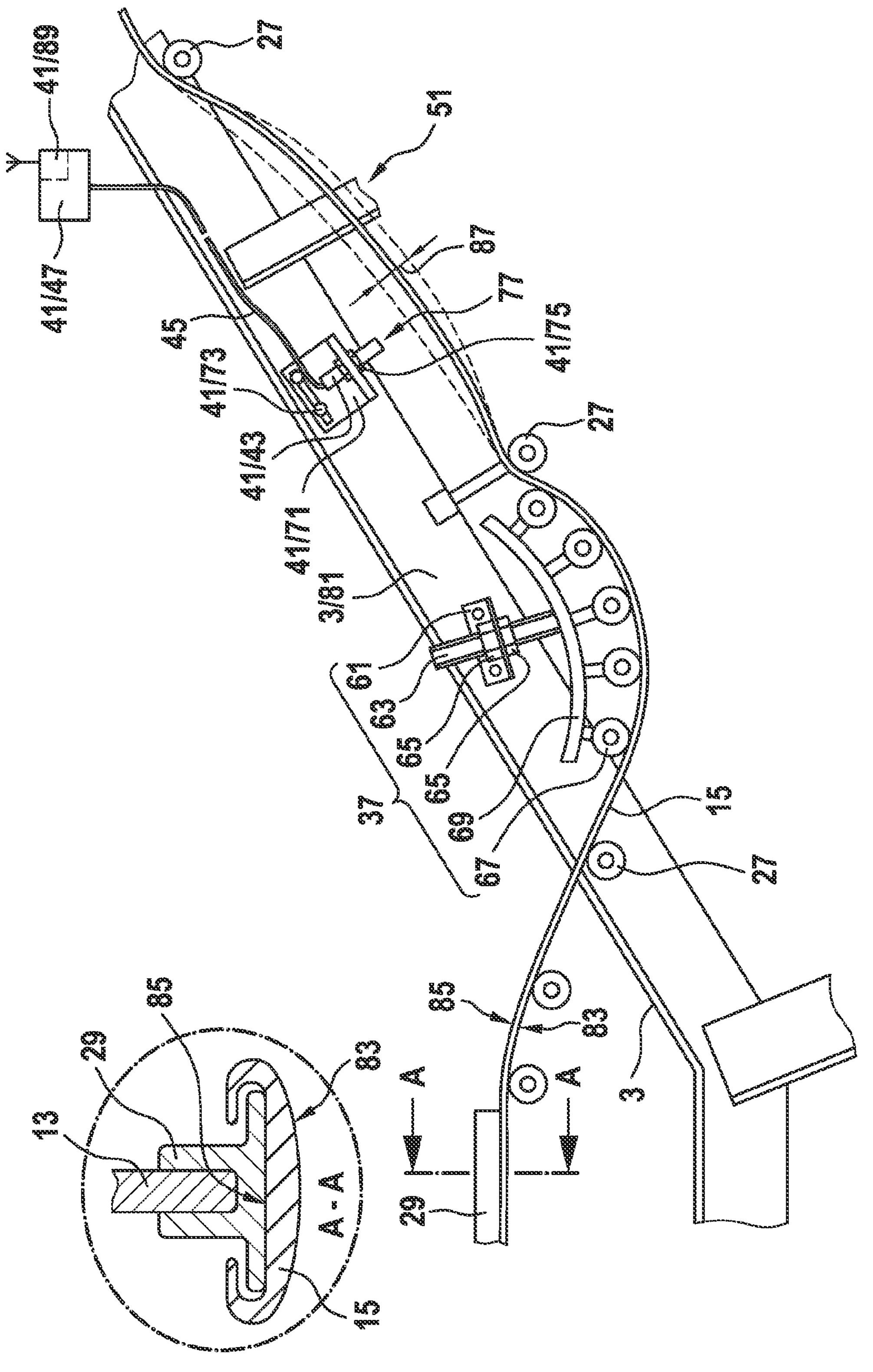
FIG. 2 is an enlarged illustration of the handrail tensioning device and the distance sensor of the handrail tension monitoring device of the passenger transport system shown in FIG. 1.

In the present example, a returning strand 21 of the handrail 15 is guided in a balustrade base 25 by means of guide rollers 27, while its leading strand 23 is guided on guide profiles 29 (see FIG. 2, section A-A). The part of the handrail 15 that is visible to the user and therefore can be gripped is the leading strand 23, while the returning strand 21 is hidden in the balustrade base 25.

The drive unit 17 is operatively connected to a main drive shaft 31. The conveyor belt 11 is also guided around the main drive shaft 31 and is driven by same. The handrail 15 is driven by friction wheels 35 of a handrail drive 33, these friction wheels 35 also being operatively connected to the drive unit 17 via the main drive shaft 31. A handrail tensioning device 37 is provided so that sufficient force can be transmitted between the friction wheels 35 and the handrail 15. The handrail 15 can be pretensioned by means of this tensioning device. Like the returning strand 21 of the handrail 15, the handrail tensioning device 37, the handrail drive 33 and the guide rollers 27 which guide the handrail 15 in places are also arranged within the balustrade base 25.

Furthermore, a distance sensor 43 of a handrail tension monitoring device 41 is arranged in the balustrade base 25. The distance sensor 43 is connected to the controller 19 of the passenger transport system 1 via a signal line 45, shown with a broken line. As indicated, a signal processing unit 47 of the handrail tension monitoring device 41 can be arranged in the controller 19 or implemented in the electronics thereof. However, it can also be implemented in the distance sensor 43 itself, or even outside the physical region of the passenger transport system 1, for example, in a data cloud 95.

In order to be able to detect vibrations of the handrail 15, the distance sensor 43 is arranged in a freely suspended region 57 of the handrail 15, preferably between two guide rollers 27. Depending on the existing handrail pretensioning force, the handrail sags to different degrees in the freely suspended region 57. When it is correctly tensioned, it sags slightly, as shown by the solid line 51. If it is tensioned too tightly, it is more likely to have the position shown by the dash-dotted line 53 and, if it is not tensioned enough, the position shown by the broken line 55.

FIG. 2 is an enlarged illustration of the handrail tensioning device 37 and the distance sensor 43 of the handrail tension monitoring device 41 of the passenger transport system 1 shown in FIG. 1. The handrail tensioning device 37 comprises a roller carrier 69 with pressure rollers 67, a spindle 63, adjusting nuts 65 and a support 61. The support 61 is attached to a stationary component 81 of the passenger transport system 1, in the example shown on an upper chord of the supporting structure 3, for example, with screws. The spindle 63, which is firmly connected to the roller carrier 69, can be adjusted relative to the support 61 by means of the adjusting nuts 65, so that the desired handrail pretensioning force can be applied to the handrail 15. Of course, handrail tensioning devices 37 with different designs can also be used, for example, having a spring element. However, such a handrail tensioning device 37 must also be re-tensioned from time to time.

The handrail tension monitoring device 41 has a holder 71 which is also mounted on the upper chord or on a stationary component 81 of the passenger transport system 1. The holder 71 is designed such that in the operating state of the handrail tension monitoring device 41, the distance sensor 43 thereof, more precisely a sensor head 77 of the distance sensor 43, is directed, in a freely suspended region 51 of the handrail 15, against a hand support surface 83 or against a rear side 85 of the handrail 15. Furthermore, the holder 71 has adjustment means 73, 75 for aligning the distance sensor 43 relative to the hand support surface 83 or to the rear side 85 of the handrail 15. In the present embodiment, these adjusting means 73, 75 are adjusting nuts 75, which at the same time also serve to fasten the distance sensor, and slot-screw connections 73 in order to mount and align the holder 71 on the stationary component 81.

The distance sensor 71 must be able to carry out a quick sequence of distance measurements, e.g., to detect the changing distances caused by vibrations (represented by the double arrow 87 and the deflections of the handrail in the freely suspended region 51 indicated by broken lines) as measurement signals and the signal curve thereof. Various distance sensors 71 are suitable for this purpose, such as a TOF camera, an infrared distance sensor, a laser distance sensor, an ultrasonic sensor with transit time detection, or a radar sensor.

As already mentioned, the measurement signals and the signal course thereof are transmitted to the signal processing unit 47 via the signal line 45, for example. Of course, instead of a signal line 45, wireless transmission can also take place, for example, via a Bluetooth connection and the like.

The signal processing unit 47 itself can be arranged in the distance sensor 71. However, as shown in FIG. 1, it can also be integrated in the controller 19 of the passenger transport system 1. Furthermore, it is also possible for the signal processing unit 47 to be implemented in a data cloud and for the necessary evaluations to be made there. In addition, the handrail voltage monitoring device 41 can have communication means 89 or can be connected to communication means 89 via which at least the detected signal curve of the measurement signals can be transmitted to a digital twin data record 101 of the passenger transport system 1.

Figure 3A:
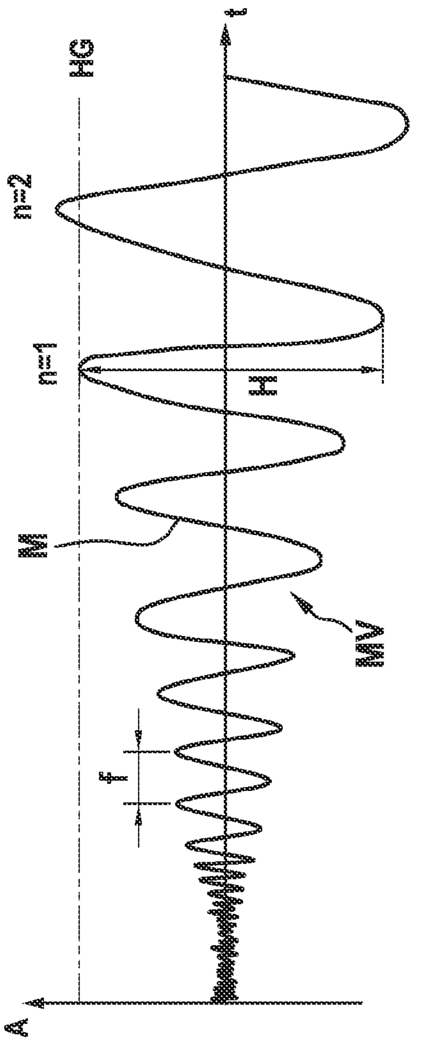
FIG. 3A shows a fictitious signal curve of the measurement signals of the distance sensor shown in FIGS. 1 and 2.
Figure 3B:
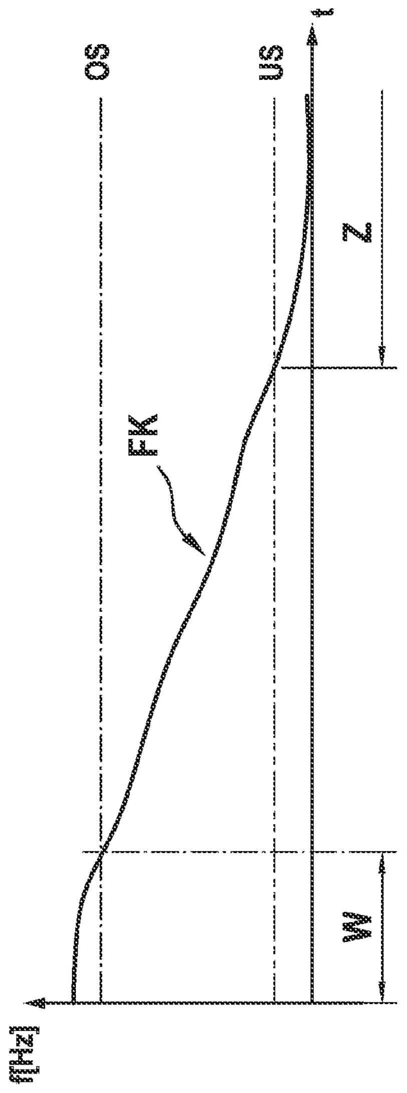
FIG. 3B shows a possible evaluation of the measurement signals shown in FIG. 3A.

A possible evaluation of the measurement signals M and the signal profile MV are shown in FIGS. 3A and 3B. FIG. 3A shows a fictitious signal curve MV of the measurement signals M of the distance sensor 43 shown in FIGS. 1 and 2.

The illustrated signal curve MV shows, beginning on the left, a low amplitude A and a high vibration frequency f. Over the operating time t, there is a loss of pretensioning force on the handrail 15 as a result of settling in the material of the handrail 15 and wear. As a result, the handrail 15 is able to vibrate further, so that the vibration frequency f decreases and the amplitude height H of the amplitudes A increases. Of course, the loss of pretensioning force does not occur within a few vibrations, but rather over a very long period of time.

FIG. 3B shows the frequency curve FK determined from the signal curve MV and an upper threshold value OS and a lower threshold value US. Starting on the left, the measured vibration frequency f is so high that the frequency curve FK exceeds the upper threshold value OS. The handrail 15 is therefore tensioned far too much, and therefore a warning signal W is generated in the signal processing unit 47 and is transmitted to the maintenance technician, for example, on his mobile phone, so that he can see immediately after re-tensioning the handrail 15 that the handrail pretensioning force is too high. He can then reduce the handrail pretensioning force to such an extent that the upper threshold value OS is not met. Of course, the warning signal W can also be transmitted to the controller 19 of the passenger transport system 1 shown in FIG. 1, thereby stopping the driving operation of the passenger transport system 1 after a few seconds.

Due to the continuous operation of the passenger transport system 1, the handrail pretensioning force decreases continuously, as a result of which the oscillation frequency f decreases and the amplitude height H increases. At some point the vibration frequency f falls below the lower threshold value US, in which case an alarm signal Z is output by the signal processing unit 47. The lower threshold value US is dimensioned such that with normal loading of the handrail 15 there is barely any slip between the friction wheel 35 of the handrail drive 33 and the handrail 15 (see FIG. 1). The lower threshold value US can be determined, for example, by means of tests, but it can also be calculated from the geometric data, the handrail drive 33, the coefficient of friction between the handrail 15 and the various friction partners along the entire handrail guide route, and the handrail pretensioning force.

Since the tensile forces in the handrail 15 are different depending on the direction of rotation due to the friction conditions and the position of the handrail drive 33 and the handrail tensioning device 37 relative to the position of the distance sensor 71, the vibration frequency f of a handrail 15 is dependent on the direction of travel. As a result, the threshold values can be established depending on the direction of travel.

The alarm signal Z is transmitted to the controller 19 of the passenger transport system 1 and, for safety reasons, this stops, for example, the driving operation of the passenger transport system 1 until the handrail 15 has been re-tensioned by means of the handrail tensioning device 37.

As can be seen from FIG. 3A, in order to verify the vibrating frequency f, a number of successive amplitude heights H of the vibrating handrail 15 can be determined from the signal curve MV of the measurement signals M and said amplitude heights are compared with a height limit value HG and a number limit value n. As a result, an impermissibly low handrail pretensioning force can also be determined when the handrail 15 is stimulated to vibrate at a higher frequency by external influences, for example, by rapid pulling at the handrail 15 and thus does not fall below the lower threshold value US. In this special case, the amplitude height H reveals that the handrail pretensioning force is too low. At the same time, however, one-time exceedance of the height limit value HG due to the number limit value n is not taken into account, so that an alarm signal A is generated only when the height limit value HG has been exceeded several times in the period under consideration or in the plurality of successive amplitudes A.

FIG. 1 shows a further option for evaluating the measurement signals M and the signal curve MV thereof from the handrail tension monitoring device 41 or from the distance sensor 43 thereof. For this purpose, a digital twin data record 101 is used, which is stored, for example, in a data processing device 95 (cloud). This digital twin data record 101 maps the passenger transport system 1 virtually. This means that each individual component of the passenger transport system 1 is also reproduced in the digital twin data record 101. The digital twin data record 101 is preferably structured in component model data records 113, which are linked to one another via interface information. In other words, the components of the passenger transport system 1 are reproduced as component model data records 113. Each of these component model data records 113 (for example, the component model data record 113 of the guide roller 27) has all the characterizing properties of the physical component to be mapped as completely as possible. Furthermore, the interface information present in the digital twin data record 101 is there to reproduce the arrangement of the components in three-dimensional space, their interaction with one another during the action and transmission of forces, moments and the like, and possibly their degrees of freedom of movement with respect to one another.

This digital twin data record 101 can, for example, be downloaded from the data processing device 95 via an input/output interface 99, a personal computer in the example shown, processed further and used for simulations 105. Of course, the simulations 105 can also be carried out in the data processing device 95, the input/output interface 99 then only being able to function as a computer terminal.

In order to be able to carry out the simulations 105, as shown by the double arrow 97, there is, for example, the option of transmitting the measurement signals and the signal curve of the distance sensor 43 to the digital twin data record 101 via the signal transmission device 89 of the handrail voltage monitoring device 41. Supplemented in this way, this can be used to carry out the simulations 105 by examining how the measurement signals M of the handrail tension monitoring device 41 affect the individual virtual components of the digital twin data record 101 represented by component model data records 113.

During the entire implementation of the simulation 105, the input/output interface 99 is in communication with the data processing device 95, as shown by the double arrow 115. Accordingly, the simulation 105 and the simulation results 107 can be displayed as a virtual representation 103 on the input/output interface 99. In this way, processes that occur when the passenger transport system 1 is in operation can be represented in real time on the input/output interface 99 in an evaluated form.

Although FIGS. 1 and 2 show a passenger transport system 1 designed as an escalator, it is obvious that the present disclosure can also be used in a passenger transport system 1 designed as a moving walkway.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above. Reference signs in the claims should not be considered to be limiting.

The invention claimed is:

1. A handrail tension monitoring device for a passenger transport system configured as a moving walkway or escalator, the handrail tension monitoring device comprising:

at least a distance sensor that produces measurement signals of a distance between the distance sensor and a handrail of the passenger transport system; and a signal processing unit that receives the measurement signals of the distance between the distance sensor and the handrail detected by the at least one distance sensor and processes the measurement signals of the distance between the distance sensor and the handrail to:

determine a vibration frequency of the handrail from a signal curve of the measurement signals of the distance between the distance sensor and the handrail, compare the vibration frequency to at least one of a lower threshold value or an upper threshold value, and generate an alarm signal if the lower threshold value is not reached and a warning signal if the upper threshold value is exceeded.

2. The device of claim 1, wherein further comprising a holder configured to be mounted on a stationary component of the passenger transport system, wherein the holder is configured such that, in the operating state of the handrail tension monitoring device, the distance sensor thereof is directed, in a freely suspended region of the handrail, against a hand support surface or against a rear side of the handrail.

3. The device of claim 2, wherein the holder comprises an adjustment device for aligning the distance sensor relative to the hand support surface or to the rear side of the handrail.

4. The device of claim 1, wherein the distance sensor is a TOF camera, an infrared distance sensor, a laser distance sensor, an ultrasonic sensor with transit time detection, or a radar sensor.

5. The device of claim 1, wherein the signal processing unit is implemented in the distance sensor, in a controller of the passenger transport system, or in a data cloud.

6. The device of claim 1, wherein the alarm signal or warning signal is transmitted to a controller of the passenger transport system, and as a result, driving operation of the passenger transport system is influenced.

7. The device of claim 1, wherein the device comprises a communication module configured such that at least the detected signal curve of the measurement signals of the distance between the distance sensor and the handrail are transmitted to a digital twin data record of the passenger transport system.

8. A passenger transport system having at least one of the handrail tension monitoring device according to claim 1.

9. A method for processing and evaluating measurement signals of a handrail tension monitoring device of a passenger transport system configured as a moving walkway or escalator, wherein the handrail tension monitoring device comprises at least one distance sensor that produces measurement signals and a signal processing unit that receives the measurement signals detected by the at least one distance sensor and processes the measurement signals, the method comprising:

determining a vibration frequency of a scanned handrail of the passenger transport system from a signal curve of the measurement signals;

comparing the vibration frequency with at least one lower threshold value or upper threshold value; and generating an alarm signal if the lower threshold value is not reached and a warning signal if the upper threshold value is exceeded.

10. The method of claim 9, wherein in order to verify the vibrating frequency, a number of successive amplitude heights of the vibrating handrail are determined from the signal curve of the measurement signals and said amplitude heights are compared with a height limit value and a number limit value.

11. The method of claim 9, wherein the detected signal curve is transmitted to a digital twin data record of the passenger transport system and the effects of the vibrating handrail on other components of the passenger transport system are determined by means of static and dynamic simulations using the digital twin data record.

12. The method of claim 9, wherein the threshold values are established depending on the direction of travel.

* * * * *